(12) United States Patent
Li et al.

(10) Patent No.: US 7,205,527 B2
(45) Date of Patent: Apr. 17, 2007

(54) APPARATUS FOR FANNING OUT NEAR INFRARED RADIATION IN AN AUTOMOTIVE OCCUPANT POSITION RESTRAINT SYSTEM

(75) Inventors: Jianhua Li, San Jose, CA (US); Hongzhi Kong, Kokomo, ID (US)

(73) Assignee: Delphi Technologies, Inc., Troy, MI (US)

( * ) Notice: Subject to any disclaimer, the term of this patent is extended or adjusted under 35 U.S.C. 154(b) by 414 days.

(21) Appl. No.: 10/730,857

(22) Filed: Dec. 9, 2003

(65) Prior Publication Data

US 2005/0121892 A1    Jun. 9, 2005

(51) Int. Cl.
*G06M 7/00*     (2006.01)
*H01J 40/14*    (2006.01)
*B60R 21/16*    (2006.01)

(52) U.S. Cl. .................. 250/221; 359/356; 340/555; 280/735

(58) Field of Classification Search ............. 250/221, 250/222.1, 341.1; 280/735; 359/356; 340/555–557; 362/276, 802, 488, 490, 268; 701/45
See application file for complete search history.

(56) References Cited

U.S. PATENT DOCUMENTS 6,914,526 B2 * 7/2005 Wallace et al. ............. 340/541
2004/0108990 A1 * 6/2004 Lieberman et al. ......... 345/156

* cited by examiner

*Primary Examiner*—Georgia Epps
*Assistant Examiner*—Suezu Ellis
(74) *Attorney, Agent, or Firm*—Jimmy L. Funke (57) ABSTRACT

An automotive occupant position restraint apparatus senses a position of an occupant of a motor vehicle. The apparatus includes an optical energy source emitting a first beam of optical energy. A first optical arrangement is disposed in a path of the first beam of optical energy. The first optical arrangement expands the first beam of optical energy into a plurality of second beams of optical energy spanning across a first angle. A second optical arrangement is disposed in a path of the second beams of optical energy. The second optical arrangement expands the second beams of optical energy into a plurality of third beams of optical energy spanning across a second angle larger than the first angle. An optical energy receiver receives optical energy from the third beams, wherein the received optical energy has been reflected within a passenger compartment of the motor vehicle.

19 Claims, 8 Drawing Sheets

APPARATUS FOR FANNING OUT NEAR INFRARED RADIATION IN AN AUTOMOTIVE OCCUPANT POSITION RESTRAINT SYSTEM

TECHNICAL BACKGROUND

This invention relates generally to automotive occupant position restraint systems, and, more particularly, to a novel automotive occupant position restraint system including an apparatus for fanning out near infrared radiation.

BACKGROUND OF THE INVENTION

While the present invention is described, for illustrative purposes, as being applied to occupant classification and position detection in a vehicle, it will be understood that it can be employed in any optical receiver system in which it is important to emit optical energy dispersed over a large arc.

Inflatable restraints, or air bags, are increasingly being used in vehicles to protect an occupant of a vehicle in the event of the vehicle being involved in a collision. Typically, a control system senses the occurrence of an accident and causes the air bag to deploy to protect the occupant from colliding with the windshield or dashboard, for example, of the vehicle. An occupant proximity sensor system may comprise part of the control system. Such a system monitors the position of the occupant of the front-outboard passenger seat and automatically, i.e., without any action required of the driver or the passenger, determines whether to suppress deployment or allow deployment of the front air bag (and perhaps the side air bag also, if the vehicle is so equipped) applicable to this position. The determination of whether or not to suppress air bag deployment is made based on the occupant being in the "at-risk" zone or on classifying the occupant as being in a rear-facing infant seat (RFIS). Conversely, the system allows air bag deployment for a properly seated occupant, i.e., seated with hips back, rearward on the seat cushion and with back resting on the seat back, who is outside of the at-risk zone.

Upon determining the position/classification of the occupant of the front-outboard seat, the system sends a signal to the sensing and diagnostic module indicating whether to suppress or allow air bag deployment. The system also sends a signal to a display indicating whether the air bag is in a suppressed or an enabled state. If the air bag is in a suppressed state, the signal alerts the driver or passenger to take corrective action, if desirable.

There are many kinds of sensor systems under development. So far, there are mainly two kinds of occupant position sensors: infrared- and ultrasonic-based sensors. Compared to the ultrasonic sensor, the infrared sensor has the faster response time. An infrared occupant position sensor can classify and recognize an occupant in less than 10 milliseconds.

The typical infrared occupant position sensor has two main elements: an emitter and a receiver. The emitter is a light source and optical system that radiates infrared light and illuminates target objects. The receiver consists of an optical system and a detector. The optical system collects light scattered by the target objects and focuses the light signal on the detector.

The emitter can emit a collimated infrared light beam through a diffractive optical element, such as a diffraction grating, to generate an array of light beams that is projected onto the occupant of the vehicle. The diffractive optical element can cause the array of light beams to fan out over an arc of approximately 60° in order to encompass a majority of the occupant's body within the sensor's field of view.

It would be desirable for the field of view of the passenger side occupant protection system to be expanded into the driver's side of the passenger compartment and other areas adjacent to the passenger side. Expanding the field of view in this manner would require the array of light beams to be fanned out over an arc of greater than 60°, such as approximately 120°. A problem is that a diffraction grating cannot fan out a light beam into an array of light beams over an arc of greater than about 60° without producing unacceptable amounts of residual light noise around the individual light beams in the array. Another problem is that a diffraction grating cannot fan out a light beam into an array of light beams over an arc of greater than about 60° and still maintain a required level of beam intensity uniformity.

What is needed in the art is an occupant proximity sensor system including an apparatus capable of fanning out an array of light beams in an arc of greater than 60°.

SUMMARY OF THE INVENTION

The present invention provides an occupant proximity sensor system including an optical system that can fan out a light beam into an array of light beams spanning an arc of approximately between 60° and 120°.

According to one embodiment of the invention, an automotive occupant position restraint apparatus senses a position of an occupant of a motor vehicle. The apparatus includes an optical energy source emitting a first beam of optical energy. A diffractive element is disposed in a path of the first beam of optical energy. The diffractive element expands the first beam of optical energy into a plurality of second beams of optical energy spanning across a first angle. A lens arrangement is disposed in a path of the second beams of optical energy. The lens arrangement expands the second beams of optical energy into a plurality of third beams of optical energy spanning across a second angle larger than the first angle. An optical energy receiver receives optical energy from the third beams, wherein the received optical energy has been reflected within a passenger compartment of the motor vehicle.

According to another embodiment of the present invention, an automotive occupant position restraint apparatus senses a position of an occupant of a motor vehicle. The apparatus includes an optical energy source emitting a first beam of optical energy. A beam splitting element is disposed in a path of the first beam of optical energy. The beam splitting element expands the first beam of optical energy into two second beams of optical energy spanning across a first angle. At least one diffractive element is disposed in paths of the second beams of optical energy. The at least one diffractive element expands each of the second beams of optical energy into a plurality of third beams of optical energy such that the third beams from the at least one diffractive element conjunctively span across a second angle larger than the first angle. An optical energy receiver receives optical energy from the third beams, wherein the received optical energy has been reflected within a passenger compartment of the motor vehicle.

According to yet another embodiment of the present invention, an automotive occupant position restraint apparatus senses a position of an occupant of a motor vehicle. The apparatus includes an optical energy source emitting a first beam of optical energy. A first optical arrangement is disposed in a path of the first beam of optical energy. The first optical arrangement expands the first beam of optical energy into a plurality of second beams of optical energy spanning across a first angle. A second optical arrangement is disposed in a path of the second beams of optical energy. The second optical arrangement expands the second beams of optical energy into a plurality of third beams of optical energy spanning across a second angle larger than the first angle. An optical energy receiver receives optical energy from the third beams, wherein the received optical energy has been reflected within a passenger compartment of the motor vehicle.

An advantage of the present invention is that an array of light beams can be fanned out over an arc of greater than 60° without creating an unacceptable level of residual light noise and non-uniform beam intensities.

Another advantage is that the optical elements that fan out the array of light beams do not require precise alignment.

Yet another advantage is that the field of view of an automotive occupant sensing system can be expanded into the area surrounding the occupant's body.

A further advantage is that the apparatus of the present invention is cost effective and easy to manufacture.

BRIEF DESCRIPTION OF THE DRAWINGS

The present invention will now be described, by way of example, with reference to the accompanying drawings, in which.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplifications set out herein illustrate an embodiment of the invention and such exemplifications are not to be construed as limiting the scope of the invention in any manner.

DESCRIPTION OF INVENTION

Figure 1:
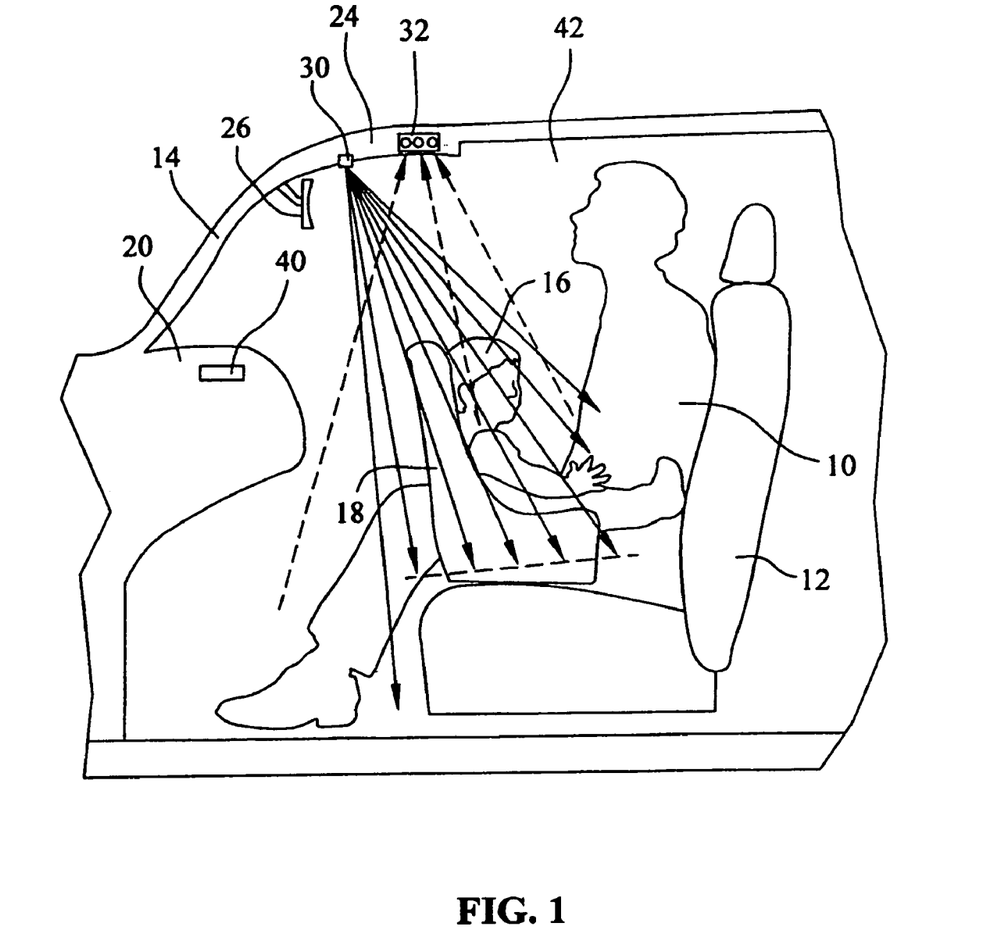
FIG. 1 is a cut-away, side elevational view of a vehicle, with an occupant seated therein, and with the position of the occupant being determined by the automotive occupant position restraint system of the present invention.

Referring now to the drawings, and particularly to FIG. 1, there is shown a person 10 seated on the front-outboard seat 12 of a vehicle 14. As shown, person 10 is properly seated on seat 12, with his hips and back placed against the back of the seat, and with the seat set at a safe distance spaced from the dashboard 20 of vehicle 14. Also illustrated on FIG. 1 is an alternative arrangement in which an infant 16 is seated in a rear facing infant seat 18, clearly within the at-risk zone.

Mounted in a console 24 behind a rear view mirror 26 in vehicle 14 is an emitter module 30, which emits optical energy in the form of infrared (IR) or near infrared (NIR) radiation. Active near infrared illuminations have the advantages of being non-intrusive to the occupants and, at the same time, providing enough sensitivity for typical silicon based receivers.

Also mounted in console 24 is a receiver module in the form of a video camera 32. Camera 32 receives optical energy in the form of LR or NIR radiation scattered or otherwise reflected by objects in the front of the passenger compartment of the vehicle. After receiving such a video stream, camera 32 generates a photographic image and/or photographic data associated with the passenger compartment 42 of the vehicle 14. Since the emitter module 30 projects multiple beams simultaneously, a camera is needed to provide sufficient spatial resolution to distinguish each individual beam in the image plane. The system recognizes occupant type, as well as occupant position and posture, with dynamic occupant position being determined using triangulation for all the beams in a single frame. In addition to the depth information obtained through triangulation, the camera also provides two-dimensional images of the occupants. The combination of the two-dimensional images and the related depth (target range) are then used for robust classification and position recognition.

Figure 2:
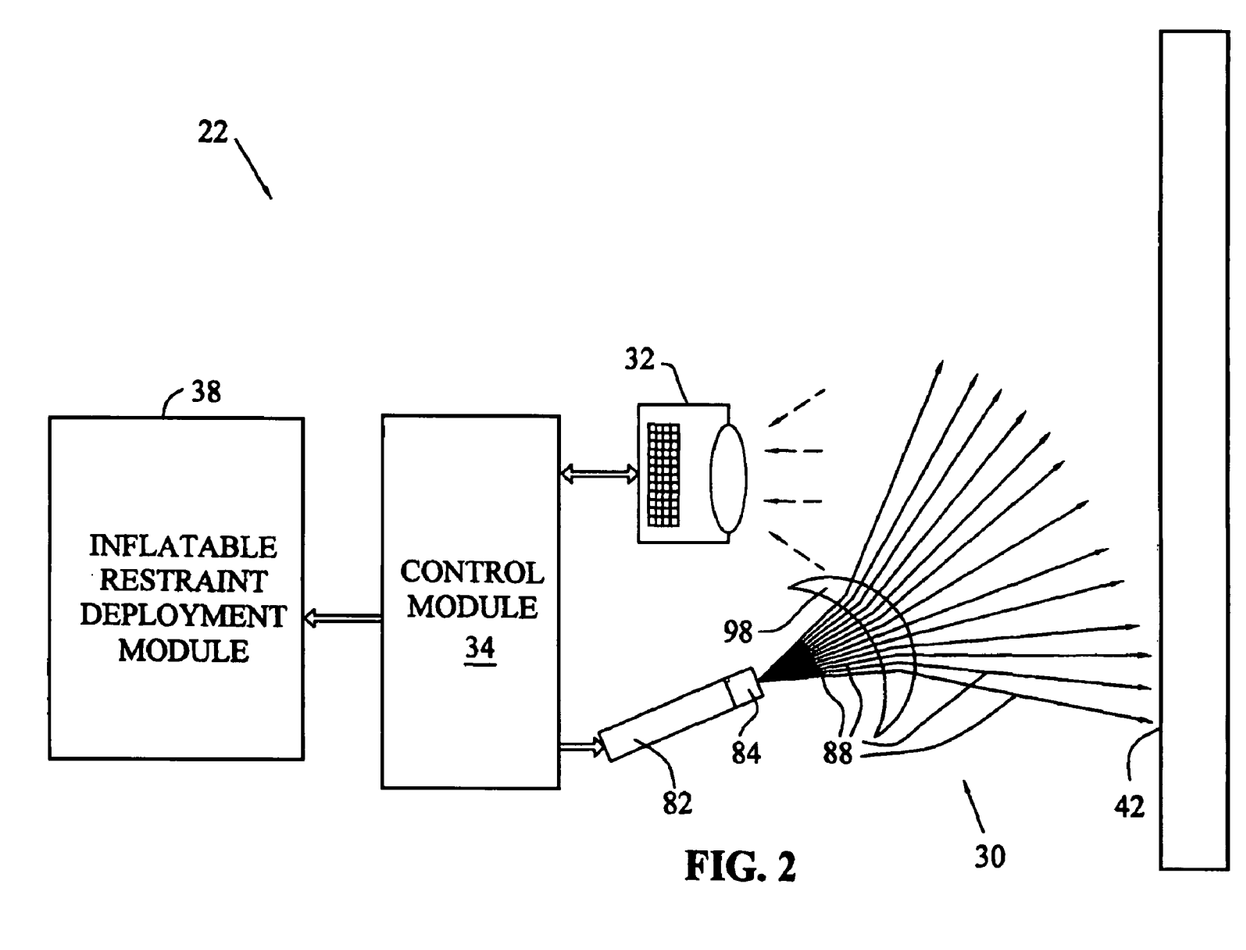
FIG. 2 is a schematic block diagram of one embodiment of the automotive occupant position restraint system of the present invention.

FIG. 2 is a schematic block diagram of an automotive occupant position restraint system 22 of the present invention, of which modules 30, 32 of FIG. 1 are a part. System 22 also can include a control module 34 and an inflatable restraint deployment module 38. An algorithm within control module 34 uses the photographic image and/or photographic data and possibly other data from receiver module 32 to decide whether the inflatable restraint, i.e., air bag 60 (FIG. 3), should be allowed to deploy in the event of the vehicle being involved in a collision. After making this decision, control module 34 can send a signal indicative of the decision to inflatable restraint deployment module 38.

Modules 30 and 32 are electrically connected to control module 34 which classifies person 10 in passenger compartment 42 and determines if the person is out of the at-risk zone and is not seated in a rear facing infant seat. In this case, person 10 is safely seated and, accordingly, control system 34 will enable the air bag (not shown in FIG. 1) associated with the front-outboard seat, so that the air bag can be deployed in case an accident occurs. Control module 34 can also cause a display 40 (FIG. 1) to provide an indication that the air bag is enabled. As noted above, if display 40 should indicate that the air bag is suppressed, then person 10 or the driver of vehicle 14 would have the opportunity to take corrective measures.

Figure 3:
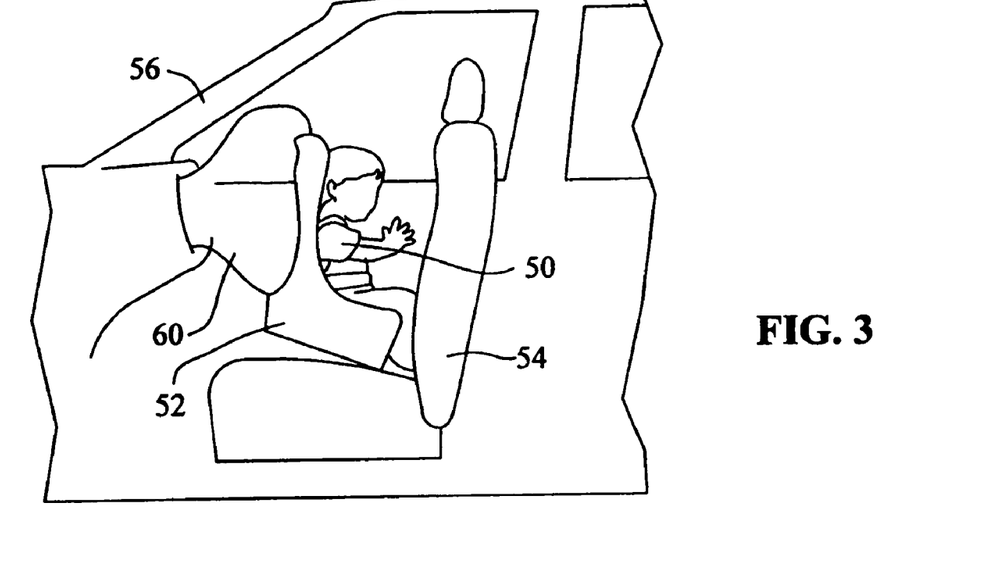
FIG. 3 is a cut-away, side elevational view of a vehicle, with a child seated in a rear facing infant seat, and indicating the consequences of having an air bag deployed in this situation.

FIG. 3 illustrates the consequences of failure to disable an air bag when the air bag is used with a child seated in a rear facing infant seat. Here, a child 50 is seated in a rear facing infant seat 52 that is attached to the front-outboard seat 54 of a vehicle 56. In this case, deployment of air bag 60 has not been suppressed and the air bag has deployed against rear facing infant seat 52, forcing the rear facing infant seat rearward. It will be appreciated that such an action can cause serious injury or death to child 50 and, in fact, there have been reported instances of such injury or death.

Figure 4:
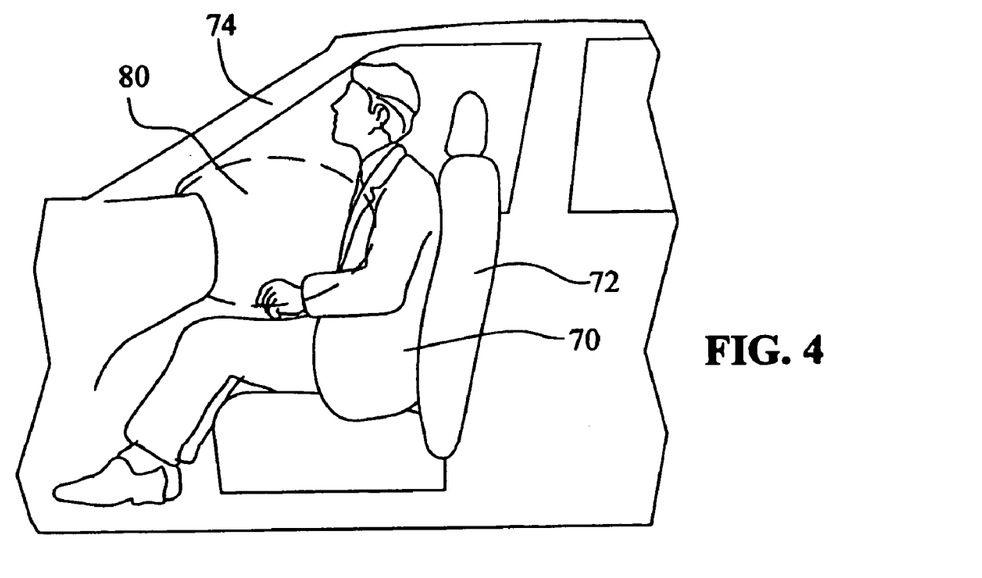
FIG. 4 is a cut-away, side elevational view of a vehicle, with an occupant seated such that the occupant is partially within the at-risk zone.

FIG. 4 illustrates the potential consequences of a person disposed within the at-risk zone. Here, a person 70 is seated on a front-outboard seat 72 in a vehicle 74. Person 70 is properly seated on seat 72, with his hips and back against the back of the seat; however, in this case, the seat has been moved too far forward, thus placing part of the body of the person 70 within an at risk-zone 80. Thus, in this case, deployment of an air bag, such as air bag 60 (FIG. 3) has the potential of causing serious injury or death to the person 70 and again, in fact, there have been reported instances of such injury or death. Proper operation of restraint system 22 (FIG. 2) will suppress deployment of the air bag 60 and will alert person 70 and the driver of vehicle 74 to the potential hazard. In this case, person could simply move seat 72 rearwardly to place himself outside of at-risk zone 80. The position sensing system would then enable the air bag 60, and display 40 (FIG. 1) would indicate enablement of the air bag 60.

Figure 5:
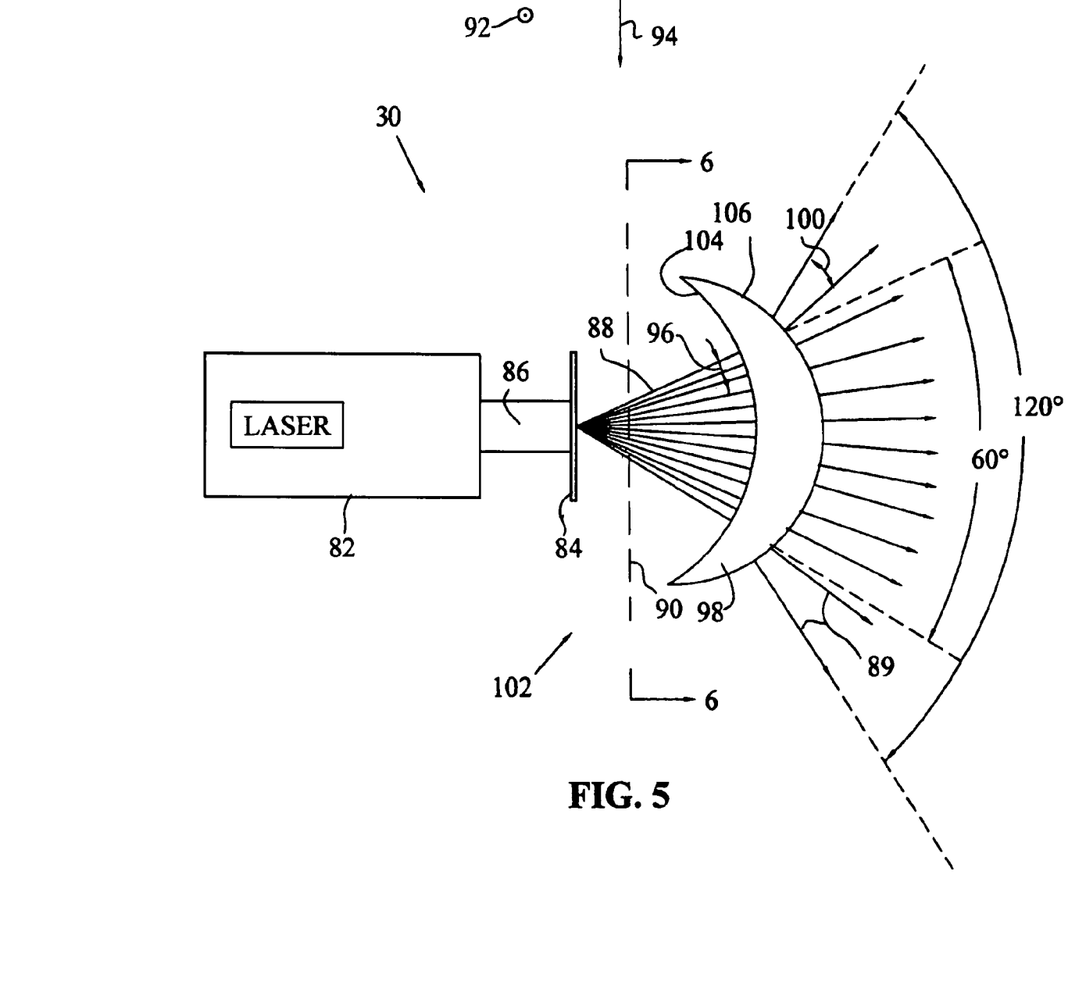
FIG. 5 is a schematic block diagram of the near infrared light emitter module of FIG. 2, wherein direction arrow 92 is pointed normally out of the plane of the drawing sheet and direction arrow 94 is pointed parallel to the plane of the drawing sheet.
Figure 5A:
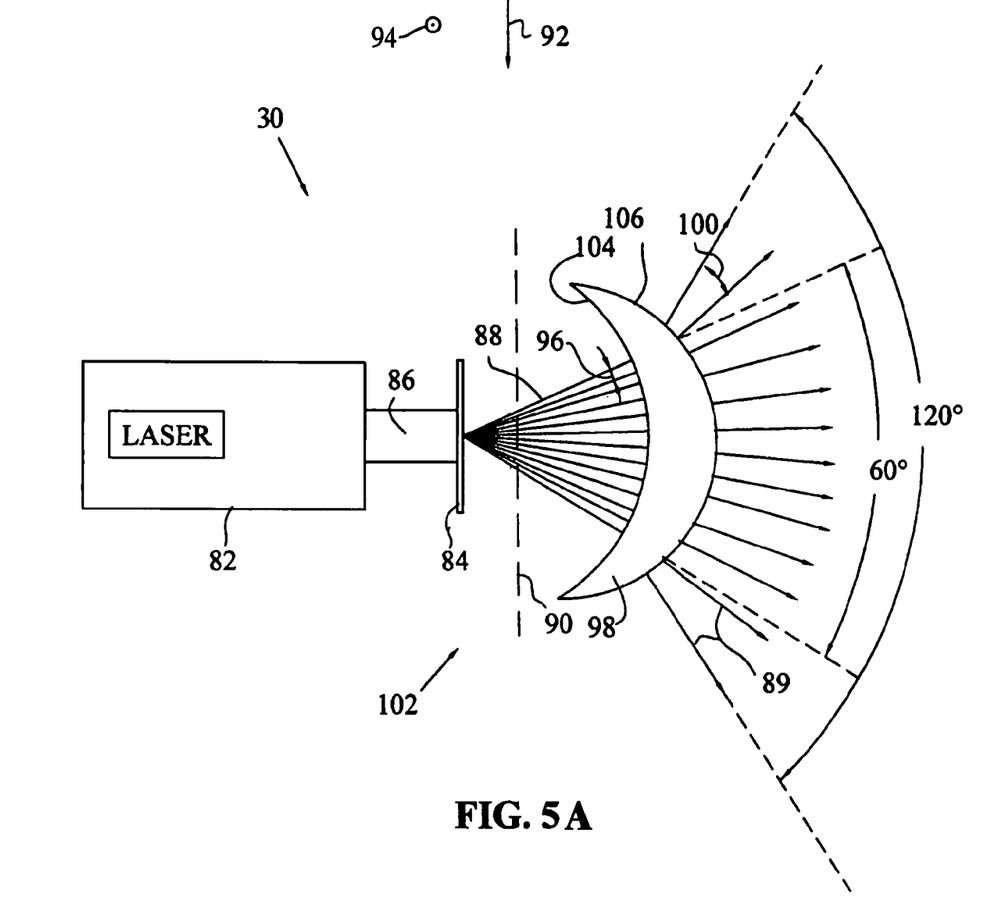
FIG. 5A is the schematic block diagram of the near infrared light emitter module of FIG. 2 corresponding to the schematic block diagram of FIG. 5 rotated 90° about horizontal, wherein direction arrow 94 is pointed normally into the plane of the drawing sheet and direction arrow 92 is pointed parallel to the plane of the drawing sheet.

The novel emitter module 30 of the present invention will now be described in more detail. Referring to FIG. 2 and FIG. 5, the emitter module 30 includes an optical energy source, which can be in the form of a laser 82. Laser 82 transmits near infrared light through a diffractive optical element, which can be in the form of a diffraction grating 84. As more clearly indicated in FIG. 5, Laser 82 emits a collimated light beam 86 which diffraction grating 84 expands into an array of lower power near infrared light beams 88 spanning over an arc of approximately 60°. Diffraction grating 84 is disposed in a path of light beam 86.

Although light beams 88 are shown as being narrower than the light beam 86 in FIG. 5 for ease of illustration, each of light beams 88 can be of the same diameter as light beam 86, although having only a fraction of the power. For example, each of light beam 86 and light beams 88 can have a diameter of approximately 3 millimeters. By way of comparison, diffraction grating 84 can have a diameter of approximately 8 millimeters.

Figure 6:
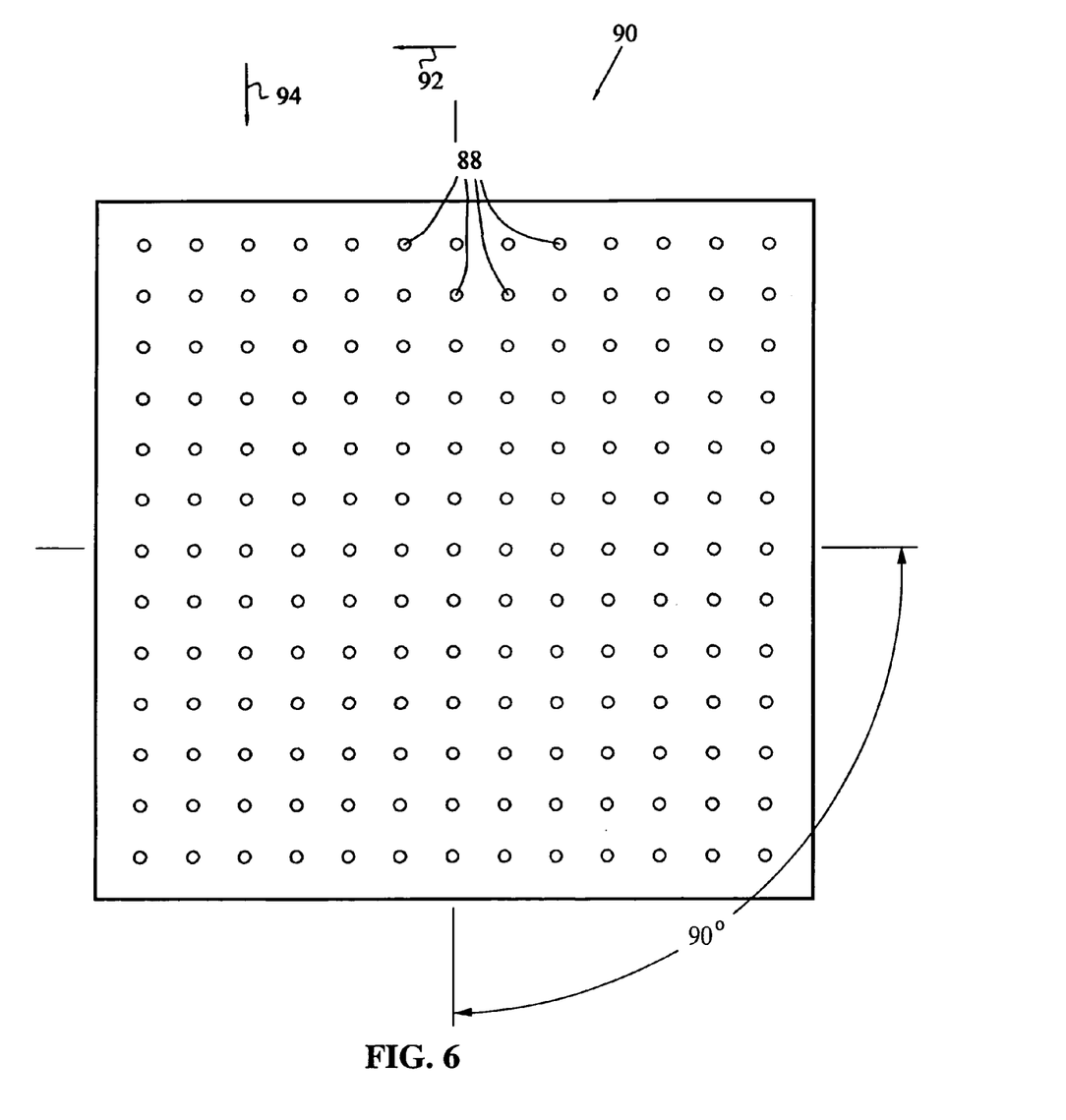
FIG. 6 is a cross-sectional view along line 6—6 in FIG. 5 of an imaginary slice through the array of light beams.

FIG. 6 provides a cross-sectional view of an imaginary slice 90 through the array of light beams 88, showing that the array of light beams 88 is three dimensional. That is, the array of light beams 88 fans out across a 60° angle or arc in a direction 92 into the page of FIG. 5 as well as in a perpendicular direction 94 across the page. The 60° angle of fanning in direction 92 is perpendicular to the 60° angle of fanning in direction 94. In the embodiment shown in FIG. 6, light beams 88 are fanned out in a thirteen row by thirteen column array of 169 light beams 88. Thus, each of light beams 88 can have a power level that is approximately 1/169 the power level of the light beam 86.

Referring to FIG. 5, the light beams 88 can be evenly spread apart such that each beam 88 is separated from each adjacent beam 88 by an angle 96 of approximately 5°. That is, thirteen beams 88 can be spaced 5° apart to thereby span an arc of approximately 60°. Although not shown in the drawings, there can be a divergence within each beam 88 of approximately 0.5°. That is, an outer envelope of each beam 88 can be cone-shaped with an internal angle of the envelope being approximately 0.5°.

As discussed above, it is desirable for the light beams 88 to span an arc of greater than 60° in order to sense a wider area within the passenger compartment 42. According to the present invention, a second optical element is used to expand the arc of the array of light beams 89 from approximately 60° to approximately 120°. More particularly, in the embodiment of FIG. 5, the array of light beams 89 is fanned out to approximately 120° by a lens arrangement 98 disposed in a path of light beams 89. The 120° angle over which beams 88 are spread after lens 98 can be coplanar with the 60° angle over which beams 88 are spread before lens 98. Similarly to diffraction grating 84, lens 98 can evenly spread out the array of light beams 88 in both direction 94 across the page of FIG. 5 and in direction 92 into the page of FIG. 5. Thus, lens 98 can fan out the array of beams 89 in an arc of approximately 120° both in direction 92 and in direction 94. Although the diameter of each individual beams 88/89 may be enlarged or expanded by passing through lens 98, this expansion is not harmful as long as adjacent beams 89 do not merge together.

After passing through the lens 98, the light beams 89 can be evenly spread apart such that each beam 89 is separated from each adjacent beam 89 by an angle 100 of approximately 10°. That is, thirteen beams 89 can be spaced 10° apart to thereby span an arc of approximately 120°. Thus, an optical system 102 including diffraction grating 84 and lens 98 can fan out a light beam 86 into 169 beams 89 spanning a 120° arc in direction 92 and spanning another 120° arc in direction 94. The 120° arc span is an approximation, and could include other values such as 90° to 150° without departing from the spirit of the invention.

In a preferred embodiment, lens 98 can be in the form of a single convex-concave negative lens. Lens 98 can be aspherical in order to achieve minimum distortion. Both concave surface 104 and convex surface 106 of lens 98 can be parabolic, with surface 104 having a focal length of 160 mm, and surface 106 having a focal length of 27 mm. Concave surface 104 can face input beams 88 in order to maintain uniformity.

Figure 7:
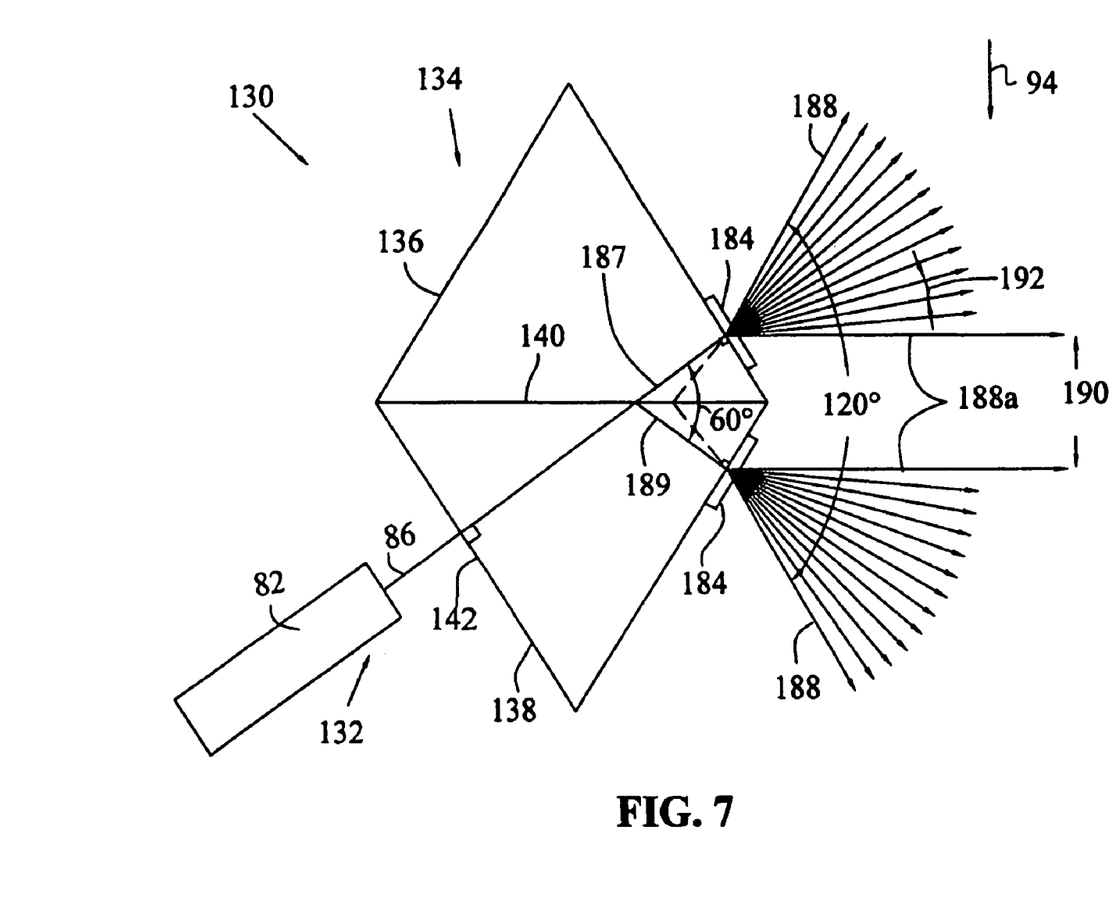
FIG. 7 is a schematic block diagram of another embodiment of a near infrared light emitter module that can be used in the system of FIG. 1.

In another embodiment (FIG. 7), an emitter module 130 includes a laser 82 and a second embodiment of an optical system for fanning out a light beam 86 into a three-dimensional array of beams 188 spanning a 120° arc in direction 94 and spanning a 60° arc in direction 92 into the page of FIG. 7. More particularly, an optical system 132 includes a beam splitter 134 and two diffractive optical elements, both which can be in the form of diffraction gratings 184.

Beam splitter 134 includes a prism pair in the form of a first prism 136 abutting a second prism 138. Both of prisms 136, 138 can be equilateral triangle prisms that abut against each other along the entire length of one side of each triangle. A beam split coating 140 is disposed between the abutting sides of the prisms 136, 138.

Beam splitter 134 is disposed in a path of light beam 86 from laser 82. Light beam 86 enters prism 138 at a right angle to a side 142 of prism 138. Upon impinging upon coating 140, beam 86 is split into two beams 187, 189 of equal power. Beam 189 reflects from coating 140 at an angle of 30°, which is equivalent to the angle at which beam 86 approaches coating 140. As beam 187 continues through coating 140, an angle of approximately 60° is formed between beams 187, 189.

Attached to respective sides of prisms 136, 138 are diffraction gratings 184 which may each be similar to diffraction grating 184. Each diffraction grating 84 is disposed in a path of a respective one of beams 187, 189.

Similarly to diffraction grating 84, diffraction gratings 184 expand respective beams 187, 189 into arrays of lower power near infrared light beams 188 spanning over arcs of approximately 60° in both directions 92 and 94.

Adjacent end beams 188*a* from each of the two arrays are parallel to each other and to coating 140. Thus, the two arrays effectively and conjunctively form one larger array spanning an angle of approximately 120° in direction 94. As the individual beams 188 get farther apart from each other as they progress into the passenger compartment, the constant, relatively smaller distance 190 between end beams 188*a* causes the two beams 188*a* to effectively function as a single beam. Thus, the two arrays effectively form one larger array of twenty-five beams 188 spread apart by angles 192 of 5° to thereby span an angle of 120° in direction 94. The larger arrays of beams 188 formed by the two smaller arrays can be spread out over an angle of approximately 60° in direction 92 into the page of FIG. 7.

Figure 8:
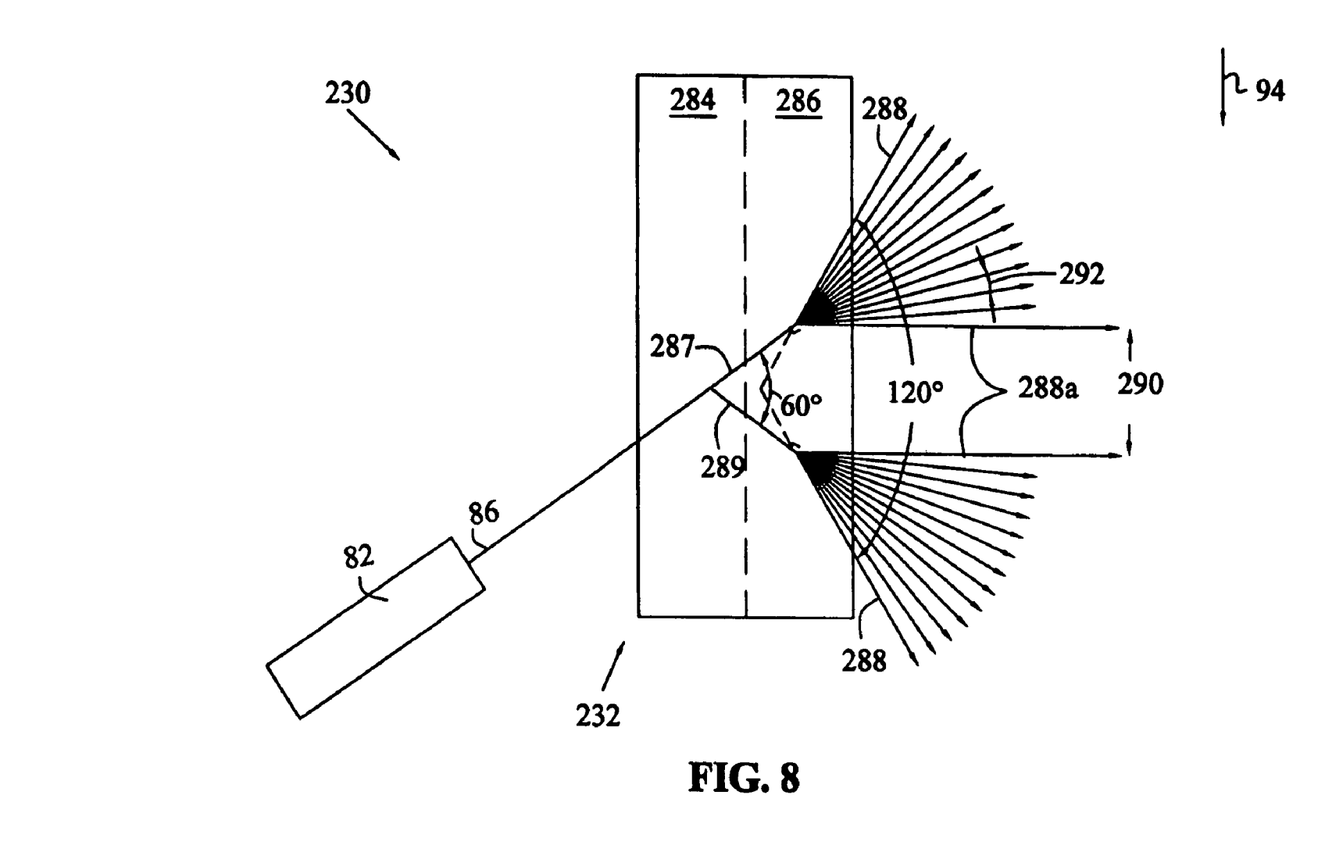
FIG. 8 is a schematic block diagram of yet another embodiment of a near infrared light emitter module that can be used in the system of FIG. 1.

In yet another embodiment (FIG. 8), an emitter module 230 includes a laser 82 and a second embodiment of an optical system for fanning out a light beam 86 into a three-dimensional array of beams 288 spanning a 120° arc in direction 94 and spanning a 60° arc in direction 92 into the page of FIG. 8. More particularly, an optical system 232 includes two diffractive optical arrangements, which can be in the form of a pair of diffraction gratings 284, 286 arranged in series. In the embodiment of FIG. 8, portions of the opposing faces of respective diffraction gratings 284, 286 are adhered together, such as by glue, as indicated by the dashed line separating diffraction gratings 284, 286.

Diffraction grating 284 is of the type of grating that functions as a beam splitter, and is disposed in a path of light beam 86 from laser 82. Upon impinging upon diffraction grating 284, beam 86 is split into two beams 287, 289 of equal power. An angle of approximately 60° is formed between beams 287, 289.

Diffraction grating 286 is of the type of grating that can take the incident angle of beams into account and expand the beams into arrays of lower power near infrared light beams spanning over arcs of approximately 60° in both directions 92 and 94. More particularly, diffraction grating 286 can take the 30° incident angles of beams 287, 289 into account and expand beams 287, 289 into arrays of lower power near infrared light beams 288 spanning over arcs of approximately 60° in both directions 92 and 94.

Adjacent end beams 288*a* from each of the two arrays are parallel to each other. Thus, the two arrays effectively and conjunctively form one larger array spanning an angle of approximately 120° in direction 94. As the individual beams 288 get farther apart from each other as they progress into the passenger compartment, the constant, relatively smaller distance 290 between end beams 288*a* causes the two end beams 288*a* to effectively function as a single beam. Thus, the two arrays effectively form one larger array of twenty-five beams 288 spread apart by angles 292 of 5° to thereby span an angle of 120° in direction 94. The larger arrays of beams 288 formed by the two smaller arrays can be spread out over an angle of approximately 60° in direction 92 into the page of FIG. 8.

The present invention uses combinations of diffractive and/or refractive/reflective optical elements to fan out a collimated light beam into lower power beams spanning a 120° arc. It is to be understood that where two separate optical elements are shown herein, the optical elements may be combined or integrated into a single component. For example, diffraction grating 84 and lens 98 can be combined into a single optical element.

Proper optical surface designs can result in minimized distortions of the light beams. Moreover, desired uniform intensity distributions in the structured light profile can be achieved.

The embodiments disclosed above are not intended to be exhaustive or to limit the invention to the precise forms disclosed in the detailed description. Rather, the embodiments have been chosen and described so that others skilled in the art may utilize their teachings.

Although described in the exemplary embodiments, it will be understood that various modifications may be made to the subject matter without departing from the intended and proper scope of the invention.

The invention claimed is:

1. An automotive occupant position restraint apparatus for sensing a position of an occupant of a motor vehicle, said apparatus comprising:
   an optical energy source configured to emit a first beam of optical energy;
   a diffractive element disposed in a path of the first beam of optical energy, said diffractive element being configured to expand the first beam of optical energy into a plurality of second beams of optical energy spanning across a first angle;
   a lens arrangement disposed in a path of the second beams of optical energy, said lens arrangement being configured to expand the second beams of optical energy into a plurality of third beams of optical energy spanning across a second angle larger than the first angle; and
   an optical energy receiver configured to receive optical energy from the third beams, wherein the received optical energy has been reflected within a passenger compartment of the motor vehicle.

2. The apparatus of claim 1, wherein said optical energy source comprises a laser configured to emit a first beam of near infrared light.

3. The apparatus of claim 1, wherein said diffractive element comprises a diffraction grating.

4. The apparatus of claim 1, wherein the second beams span across a third angle oriented perpendicular to the first angle.

5. The apparatus of claim 4, wherein the third beams span across a fourth angle oriented perpendicular to the second angle.

6. The apparatus of claim 1, wherein the second angle is approximately between 90° and 150°.

7. An automotive occupant position restraint apparatus for sensing a position of an occupant of a motor vehicle, said apparatus comprising:
   an optical energy source configured to emit a first beam of optical energy;
   a beam splitting device disposed in a path of the first beam of optical energy, said beam splitting device being configured to expand the first beam of optical energy into two second beams of optical energy spanning across a first angle;
   at least one diffractive element, said at least one diffractive element being disposed in paths of the second beams of optical energy, said at least one diffractive element being configured to expand each of the second beams of optical energy into a plurality of third beams of optical energy such that the third beams from said at least one diffractive element conjunctively span across a second angle larger than the first angle; and
   an optical energy receiver configured to receive optical energy from the third beams, wherein the received optical energy has been reflected within a passenger compartment of the motor vehicle.

8. The apparatus of claim 7, wherein said beam splitting device comprises a first diffraction grating, and said at least one diffractive element comprises a second diffraction grating.

9. The apparatus of claim 7, wherein said beam splitting device comprises a pair of equilateral triangle prisms having a beam split coating disposed therebetween.

10. The apparatus of claim 7, wherein the third beams span across a third angle oriented perpendicular to the second angle.

11. The apparatus of claim 7, wherein said at least one diffractive element comprises a pair of diffraction gratings attached to said beam splitting device.

12. The apparatus of claim 7, wherein the second angle is approximately between 90° and 150°.

13. An automotive occupant position restraint apparatus for sensing a position of an occupant of a motor vehicle, said apparatus comprising:
   an optical energy source configured to emit a first beam of optical energy;
   a diffractive element disposed in a path of the first beam of optical energy, said first optical arrangement being configured to expand the first beam of optical energy into a plurality of second beams of optical energy spanning across a first angle;
   an optical arrangement disposed in a path of the second beams of optical energy, said optical arrangement being configured to expand the second beams of optical energy into a plurality of third beams of optical energy spanning across a second angle larger than the first angle; and
   an optical energy receiver configured to receive optical energy from the third beams, wherein the received optical energy has been reflected within a passenger compartment of the motor vehicle.

14. The apparatus of claim 13, wherein said optical energy source comprises a laser configured to emit a first beam of near infrared light.

15. The apparatus of claim 13, wherein the second beams span across a third angle oriented perpendicular to the first angle.

16. The apparatus of claim 15, wherein the third beams span across a fourth angle oriented perpendicular to the second angle.

17. The apparatus of claim 13, wherein the second angle is approximately between 90° and 150°.

18. The apparatus of claim 13, wherein said diffractive element comprises a beam splitter.

19. The apparatus of claim 13, wherein the first angle is coplanar with the second angle.

* * * * *